H. F. T. HALE.

Reservoir Stoves.

No. 5,369. Reissued April 22, 1873.

ATTEST:
H. J. Sprague
Theo. S. Day

INVENTOR
H. F. T. Hale
By Atty —
Wm S Sprague

A.M. PHOTO-LITHOGRAPHIC CO. N.Y. (OSBORNE'S PROCESS.)

UNITED STATES PATENT OFFICE.

HENRY F. T. HALE, OF BAY CITY, MICHIGAN.

IMPROVEMENT IN RESERVOIR-STOVES.

Specification forming part of Letters Patent No. 44,183, dated September 13, 1864; reissue No. 5,369, dated April 22, 1873; application filed January 2, 1873.

*To all whom it may concern:*

Be it known that I, HENRY F. T. HALE, of Bay City, in the county of Bay and State of Michigan, have invented a new and useful Improvement in Reservoir-Stoves; and I do declare that the following is a true and accurate description thereof, reference being had to the accompanying drawing and to the letters of reference marked thereon and being a part of this specification, in which—

Figures 1, 2:
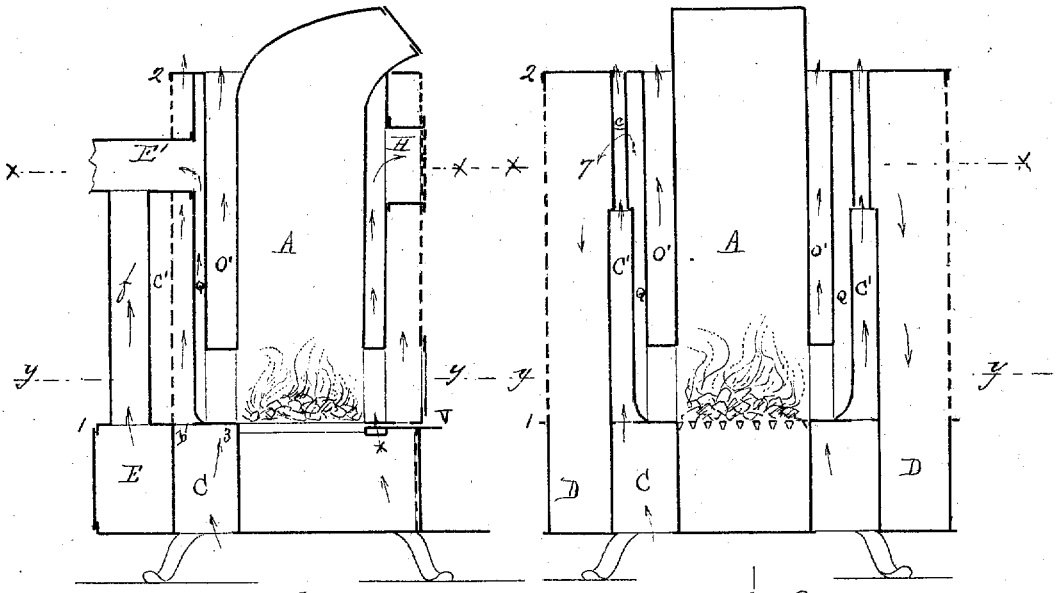
Figure 3:
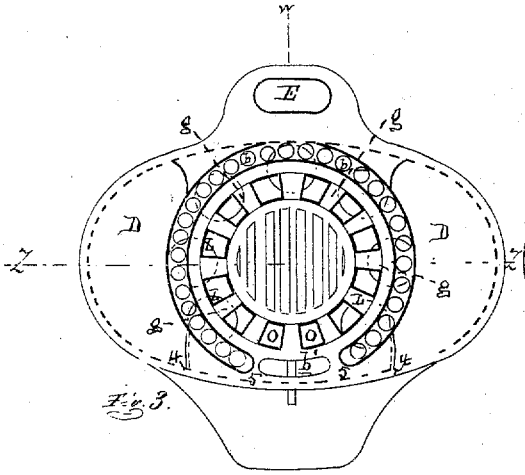
Figure 4:
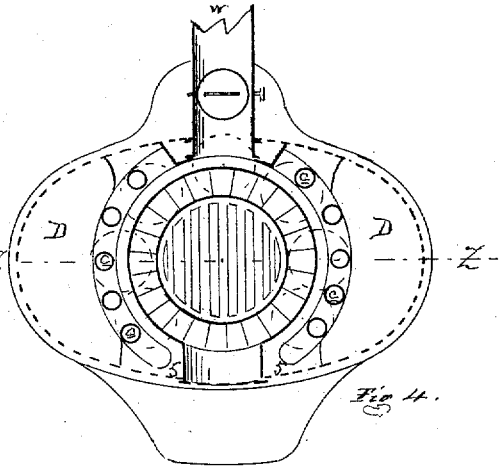

Figure 1 shows an elevation of my stove in section on a line, W, of Figs. 3 and 4. Fig. 2 shows another sectional elevation on a line, *z*, at right angles to the line W. Fig. 3 is a plan view of a section taken on a line, *y*, in Figs. 1 and 2. Fig. 4 is a similar view at the line *x*.

Like letters refer to like parts in each figure.

The outer case of the stove has been left off. It is therefore drawn in the several figures in heavy dotted lines, and is intended to embrace the inner parts and flues of the stove between the plates 1 and 2.

The invention consists, first, in providing an air-chamber surrounding the fuel-reservoir, through which currents of air may pass, for the purpose of cooling, to a certain extent, said fuel-reservoir, to prevent its contents from coking and throwing off their gases, which, if thrown off, would pass through the opening for the admission of the fuel; and in the peculiar construction and arrangement of the various parts, as more fully hereinafter set forth.

In the accompanying drawing, A represents the fuel-reservoir, the mouth of which is closed by a cover. The wall of the fire-pot is made of vertical hollow bars O, which are open at top and bottom to allow the free passage of air, as indicated by the arrows 3. These bars open below into the cold-air chamber C, and above into the annular chamber O′, which is open at top and entirely surrounds the reservoir A.

Thus it will be seen that the air becomes heated, to a certain extent, in passing through the hollow grate-bars, before being conveyed into the air-chamber, which latter thus performs the double office of furnishing an outlet to the air which passes through the grate-bars, while at the same time it prevents the contents of the fuel-reservoir from being coked and emitting their gases.

The chamber C is U-shaped, and surrounds the ash-pit on all sides except the front, and is itself surrounded by the base-flue D. Cold air from beneath the stove is allowed to enter the chamber C through suitable holes in the bottom plate of the stove, shown in dotted lines in Figs. 3 and 4, and marked L. Spaces *g* are left between the vertical bars *o*, through which the products of combustion pass into an annular chamber, Q, surrounding chamber O′. This chamber Q is closed above by the top plate 2, and the direct-draft pipe E′ opens into it, as shown in Fig. 1. Without the chamber Q is another annular chamber, C′, opening below into the cold-air chamber C, and extending to the height shown in Fig. 2, where it is connected to the open pipes *c*, shown in cross-section in Fig. 4, and in Fig. 2 in longitudinal section. The chamber C does not form a complete annulus, but terminates at point 5 on the front of the stove, in line with the ash-door openings. The space thus left forms part of the flue-space Q; and an opening, *b′*, is made through the plate 1 of the stove, so as to connect this flue-space with the ash-pit, for the purpose of moderating the draft, if necessary. The hot-air pipe H also passes through this space from the hot-air chamber O′, in order to furnish the means of securing a connection with pipes leading the hot air to other apartments. The spaces between the walls of the small pipes *c* connect the annular chamber Q to flues D, and the products of combustion are indicated, by arrows 7 in Fig. 2, as passing from one to the other. The annular chambers D are formed by the outside case, the position of which is shown in heavy dotted lines, as it is not thought necessary to do more than indicate its location between the upper and lower plates 2 and 1. The base-flues D are formed at the sides of the stove, within the outer casings of its lower parts, and the outside of the annular chamber C; and they extend from the points 4 on each side of that chamber around toward the back part of the stove until they reach the chamber E, which is merely a continuation of them. A pipe, *f*, connects the chamber E with the pipe E′ behind the damper.

The holes *b*, shown in Fig. 3, represent the openings from the annular chamber C′ into the cold-air chamber C. V is the bar about which the horizontal grate of the fire-pot is rocked to dump it. It passes between two flat air-channels, one of which is shown in Fig. 1 at *x*, the office of which is to pass the air from the cold-air chamber into the two front tubular grates *o*, shown in Fig. 3. These flat tubes *x*—of which there are two—extend from the cold-air chamber at each side of the ash-pit, respectively, under the plates 1, and along the top of the ash-pit, until they communicate a supply of air to those vertical grate-bars which are situated above the front of the ash-pit. No such provision needs to be made for the other vertical grate-bars, for the reason that the side and end walls of the ash-pit coincide with a line projected downward from the inner face of those bars.

What I claim as my invention, and desire to secure by Letters Patent, is—

1. The hollow vertical grate-bars, in combination with the chamber O′, substantially as shown.

2. The small pipes *c*, in combination with the chamber O′ and air-chamber C′, and hollow grate-bars, substantially as and for the purposes set forth.

3. The arrangement of the hollow vertical grate-bars with the flues Q, D D, and E, substantially as described.

4. The flat air-chambers *x*, for supplying the front vertical grate-bars of the fire-pot with air, substantially as and for the purposes set forth.

5. The fuel-reservoir A, open annular chambers C C′ *c*, flue Q, chamber O′, flues or pipes H E, and the vertical bars and the horizontal grate, all combined and arranged as described, for the purpose set forth.

H. F. T. HALE.

Witnesses:
H. G. ROBBINS,
GEO. W. BLACKMAN.